United States Patent [19]
Wilson

[11] 4,381,125
[45] Apr. 26, 1983

[54] HYDRAULICALLY-OPERATED ANTI-SKID VEHICLE BRAKING SYSTEM WITH PUMP

[75] Inventor: Alexander J. Wilson, Sutton Coldfield, England

[73] Assignee: Lucas Industries Limited, Birmingham, England

[21] Appl. No.: 231,393

[22] Filed: Feb. 4, 1981

[30] Foreign Application Priority Data

Feb. 7, 1980 [GB] United Kingdom ................. 8004161

[51] Int. Cl.³ ............................................... B60T 8/02
[52] U.S. Cl. ................................................... 303/116
[58] Field of Search ............................ 303/116, 10-12, 303/113-115, 117-119, 61-63, 68-69; 188/181

[56] References Cited
U.S. PATENT DOCUMENTS 3,288,538 11/1966 Marcellus ....................... 303/116 X
3,388,951 6/1968 Marcellus ........................... 303/116
3,524,684 8/1970 Skoyles ............................... 303/116
3,743,363 7/1973 Hodge et al. ....................... 303/116

Primary Examiner—Douglas C. Butler
Attorney, Agent, or Firm—Scrivener, Clarke, Scrivener and Johnson

[57] ABSTRACT

An hydraulically-operated anti-skid braking system includes a pump rotatable with a wheel to be braked and of the type which, once a predetermined minimum wheel speed is attained, produces a constant output flow irrespective of any further increase in the wheel speed, and a fixed orifice through which the output flow from the pump is circulated to provide a back pressure which is utilized to control the application of a brake. Since the pump is rotatable with a wheel to be braked by the brake, the wheel is automatically prevented from locking.

11 Claims, 1 Drawing Figure

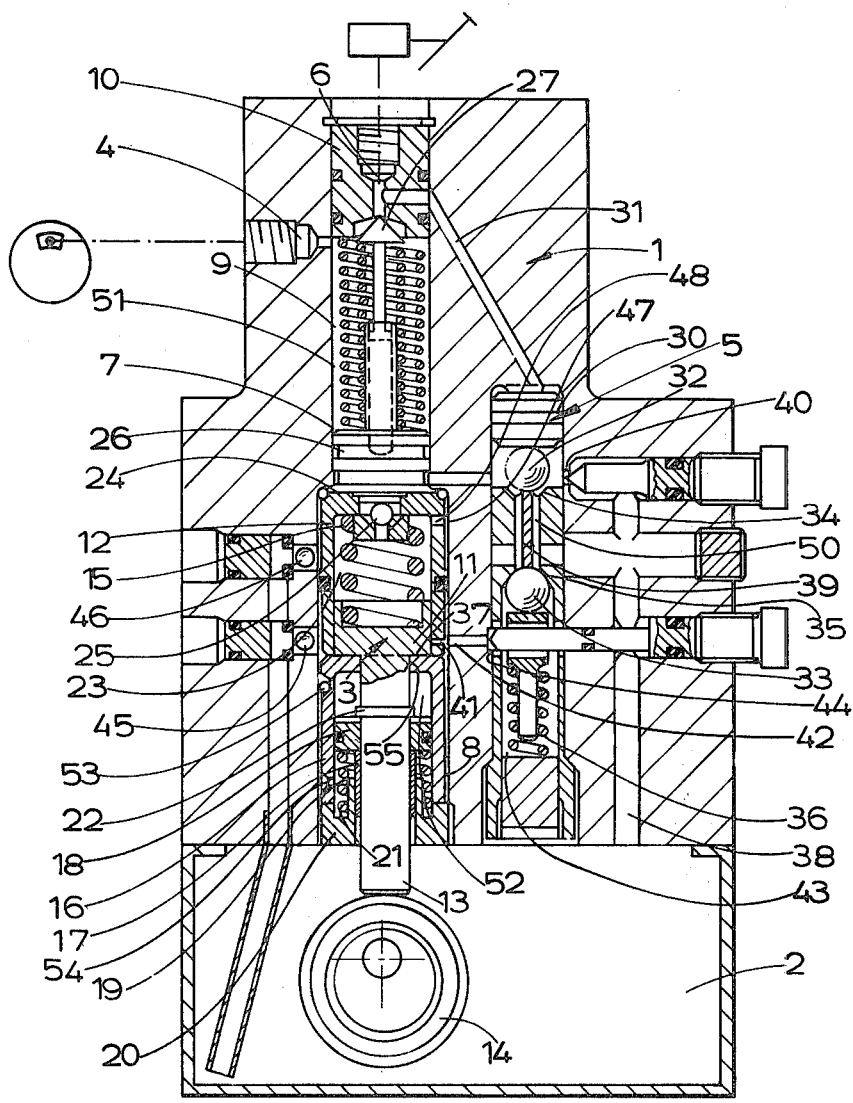

HYDRAULICALLY-OPERATED ANTI-SKID VEHICLE BRAKING SYSTEM WITH PUMP

SPECIFIC DESCRIPTION

This invention relates to hydraulically-operated anti-skid braking systems for vehicles of the kind in which at least one brake is adapted to be applied in response to a pressure of a supply of hydraulic fluid passed through a first orifice from a pump, which is rotatable with rotation of a wheel to be braked so that the wheel is automatically prevented from locking.

In some known braking systems of the kind set forth the pump is of the fixed displacement type and the flow from the pump is passed through a variable orifice of which the size is controlled to produce a back-pressure irrespective of wheel speed, which back-pressure is utilised for brake application. The magnitude of the back-pressure can be varied by permitting a proportion of the flow from the pump to by-pass the orifice.

In such known braking systems difficulty may be experienced in producing the variable orifice, in view of advanced high-precision machining and assembly techniques which may be required. In addition, the cost of producing such a variable orifice may be considered to be prohibitive. Furthermore, once produced, difficulty may be experienced in controlling the operation of the variable orifice, to give the required characteristics in service.

According to our invention in an hydraulically-operated anti-skid braking system of the kind set forth the pump is of the type which, throughout a wheel speed range above a predetermined minumum wheel speed, produces a substantially constant output flow irrespective of any further increase in the wheel speed.

We can therefore provide the system with a first orifice, suitably a fixed orifice, which is so constructed and arranged as to produce a higher proportional drop in pressure for a given proportional drop in flow to provide a back-pressure which is utilised for brake application.

Thus the system is relatively simple to produce.

The pump may comprise a piston which is reciprocable in a bore to draw fluid from a reservoir and into a pumping chamber, through a one-way valve, during an induction stroke, and to force fluid from the pumping chamber to supply services upon movement of the piston in the opposite direction during a power stroke, and a control chamber defined between one end of the bore and the adjacent end of the piston opposite the pumping chamber and into which fluid is drawn from the reservoir, and through a second one-way valve, during the power stroke, leakage from the control chamber being controlled such that movement of the piston in the bore during the induction stroke takes place substantially at a constant rate.

The terms "induction" and "power" used herein refer to the pumping chamber.

Preferably the leakage from the control chamber is controlled by a second fixed orifice.

A valve may be located in series with, and preferably downstream of, the fixed orifice and, when that valve is closed, fluid is trapped in the control chamber to hold the piston in a t.d.c. position in which the piston is disabled from its drive.

One embodiment of our invention is illustrated in the single FIGURE of the accompanying drawings which illustrates an hydraulically-operated braking system.

The hydraulically-operated braking system illustrated in the drawings comprises a housing 1 incorporating a reservoir 2 for hydraulic fluid, a pump 3 for drawing fluid from the reservoir 2 for delivery through a control system to cause delivery of brake fluid from an outlet port 4 for connection to a wheel brake, at least when that brake is to be applied, and a control assembly 5 for controlling operation of the pump 3 in response to fluid pressure from a master cylinder which is applied to the control assembly 5 through an inlet port 6.

The housing 1 has a longitudinal bore 7 of stepped outline having a bore portion 8 of greater area in which the pump 3 is housed and a bore portion 9 of smaller area of which the open end is closed by a plug 10 in which the inlet port 6 is provided.

The pump 3 comprises a piston 11 which works in the bore of a cup-shaped sleeve 12. The piston 11 is carried by a piston-rod 13 of which the free end is urged into engagement with a eccentric drive 14 from a wheel of a vehicle by means of a compression spring 15 acting between the piston 11 and the closed end of the sleeve 12. The piston-rod 13 works through an opening in the closed end of a second cup-shaped sleeve 16, and through a bore 17 in a damper piston 18 and an integral piston-rod 19 by which it is carried. The damper piston 18 works in the bore in the sleeve 16 and the piston-rod 19, in turn, works through an opening in a closure member 20 for the open-end of the bore portion 8, which is adjacent to the reservoir 2. A compression spring 21 acting between the closure member 20 and the damper piston 18 normally urges the damper piston 18 towards a radial shoulder 22 at an intermediate point in the length of the piston-rod 13.

A pumping chamber 23 within the sleeve 12 and above the piston 11 communicates with a power chamber 24 through a one-way valve 25, and a slave piston 26 working in the bore portion 9 is subjected on one side to the pressure in the power chamber 24, and on the other to fluid for the brake actuator. The slave piston 26 controls a cut-off valve 27 which, in turn, is operative to control communication between the inlet port 6 and the outlet port 4.

The control assembly 5 comprises a control piston 30 which is subjected on one face to the pressure of the master cylinder through an inclined passage 31 and on the opposite face to the pressure in the power chamber 24. A pair of ball valve members 32 and 33 cooperate with spaced seatings 34 and 35 in the housing 1. A spring assembly 36 normally urges the ball 33 against the seating 35 to isolate a control chamber 37 from a reservoir return passage 38 and, in this position, a push-rod 39 acting between the balls 33 and 32 holds the ball 32 away from the seating 34 so that the power chamber 24 is in communication with the return passage 38 both through the valve 34 and through a fixed orifice 40. The fixed orifice 40 has a square law relationship between the flow through it and the pressure-drop developed across it.

The control chamber 37 comprises a space between the piston 11 and the closed end of the sleeve 16, and communicating passages 41 and 42 in the sleeve 12 and in the adjacent wall of the housing 1 which lead to a fixed orifice 44 between the passage 42 and the chamber 43 in which the spring assembly 36 is housed.

During upward movement of the piston 11 from the b.d.c. position shown in the drawing fluid from the reservoir 2 is drawn freely into the control chamber 37 through a one-way valve 45, a clearance between the bore 8 and the sleeve 12, and the passage 41 whilst, at the same time, fluid in the pumping chamber 23 is pumped during this power stroke into the power chamber 24 through the one-way valve 25. During downward movement of the piston 11 in the opposite direction fluid from the reservoir 2 is drawn, during an induction stroke, into the pumping chamber 23 through a one-way valve 46, an annular space 47 defined between the sleeve 12, the bore portion 8 above a seal between the sleeve 12 and the bore portion 8, and a radial port 48 in the wall of the sleeve 12; whilst at the same time fluid from the annular space below the piston 11 is expelled through the second orifice 44 to the reservoir via the chamber 43, the valve 33, and the passage 38.

In the position shown in the drawing the volume of the control chamber 37 is at a minimum, and that of the pumping chamber 23 is at a maximum.

When the wheel rotates in a "brakes-off" condition the ball 33 will be urged into engagement with the seat by the spring assembly 36, the ball 32 will be held clear of the seat 34 by the push-rod 39, and the eccentric drive 14 urges the piston 11 upwards into the t.d.c. position, with fluid being drawn from the reservoir 2 into the control chamber 37 through the one-way valve 45, and the fluid in the pumping chamber 23 being pumped into the power chamber 24 through the one-way valve 25, as described above. The fluid in the power chamber 24 returns to the reservoir 2 through the orifice 40 and through the unrestricted clearance between the ball 32 and the seating 34, which leads into the return passage 38 through a clearance 50 between the push-rod 39 and a bore through which it extends. Since the ball 33 is in engagement with the seating 35, fluid is trapped in the control chamber 37. This holds the piston 11 at t.d.c. so that the pump 3 is disabled whilst the wheel continues to rotate in the "brakes-off" condition.

Also, in the "brakes-off" condition, the valve 27 is open so that the inlet port 6 and the outlet port 4 are in open communication.

When the brakes are to be applied fluid from the master cylinder at the inlet port 6 acts on the control piston 30 to urge it in a direction to cause the ball 32 to engage with the seating 34 and urge the ball 33 away from the seating 35. The trapped fluid in the space between the piston 11 and the sleeve 12 and in the passages 41 and 42 is expelled at a rate determined by the size of the orifice 44 and the load in the spring 15 which, therefore, determine the rate at which the piston 11 can descend towards the drive 14. During this movement of the piston 11 fluid is drawn into the pumping chamber 23 through the one-way valve 46, and the one-way valve 25 is closed.

We arrange for the spring 15 to have a low rate so that its loading will remain substantially constant over the stroke of the piston 11. The rate of descent of the piston 11 will therefore also be substantially constant.

When the piston 11 is moved upwardly by the drive 14, the fluid in the pumping chamber 23 is pumped into the pressure chamber 24 through the one-way valve 25. That liquid is pressurised since it is trapped in the pressure chamber 24 by the engagement of the ball 32 with the seating 34 and the rate at which it can return to the reservoir is controlled by leakage through the square-law orifice 40. The slave piston 26 is urged towards the plug 10 by the pressure in the chamber 24 which, initially, closes the valve 27 to isolate the inlet port 6 from the outlet port 4 and thereafter to pressurise the liquid in a brake-applying chamber 51 above the slave piston 26 and which is connected to the brake through the outlet port 4.

The delivery of the pump 3 will depend upon the distance through which the piston 11 decends before the eccentric drive 14 has rotated through a sufficient angular distance to start urging the poston 11 upwards in the opposite direction against the load in the spring 15. The delivery of the pump 3 is clearly independent of the speed of rotation of the wheel driving the pump 3.

For $$Q = W \times A \times S$$

where
Q = flow rate
A = area of the piston 11
S = effective stroke of the piston 11
W = rotational speed of the wheel
but $$S = V/W$$

where
V = the return speed of the piston 11.
Therefore $Q = A \times V$
Therefore Q is independent of W.

Thus the pump 3 produces a constant delivery independent of the rotational speed of the wheel. This is because the effective stroke S of the piston 11 is reduced as the rotational speed W of the wheel increases.

As the rotational speed W of the wheel is reduced during normal braking, the stroke S of the piston 11 gradually increases and the flow through, and consequently the pressure drop across, the square-law orifice 40 remains constant. Thus the wheel decelerates evenly to a stop position.

It is necessary however, to ensure that the pump 3 is prevented from responding too quickly to changes in the rotational speed W of the wheel otherwise, inadvertently, it will compensate for higher rates of wheel deceleration which are indicative of a skid.

This is achieved by the provision of a damper chamber 52 which is disposed within the sleeve 16 on opposite sides of the damper piston 18 which are interconnected by an upper one-way valve 53 and a lower radial damper orifice 54, both disposed in the wall of the sleeve 16. The space above the piston 18 is connected to the control chamber 37 through a leak path 55 between the piston-rod 13 and the opening in the sleeve 16. The orifice 54 also provides communication between the control chamber 37 and the damper chamber 52. Thus flow from the space above the piston 18 into the space below is substantially unrestricted but flow in the opposite direction is restricted substantially by the one-way valve 53.

During normal running of the vehicle in the "brakes-off" condition the pressure trapped in the control chamber 37 acts on opposite sides of the damper piston 18 and, because of the difference in their effective areas, due to the presence of the piston-rod 19, urges the damper piston 18 relatively towards the drive 14 and into its lowest position against the force in the compression spring 21.

When the brakes are applied as described above the piston 11 is repeatedly urged in the upward direction by the drive 14 and executes a downward stroke depending on the speed of the drive under the control of the orifice 44 and the spring 15. The biassing force which has been holding the damper piston 18 in its lowest position is relieved and the piston 18 rises until restrained by the repeated engagement with the radial shoulder 22 on the pump piston 11, the effect of the orifice 54 and the spring 21 then being added to the stroke limiting effect of the second orifice 44. Thus the piston 11 executes a smaller number of larger strokes as the brakes are applied, larger than are permitted when the shoulder 22 has engaged the damper piston 18 during steady braking. Stated another way the damper piston 18 is notionally free to follow the pump piston 11, under the influence of the spring 21. If this happened in practice the characteristics of the system would be upset because the effect of the damper orifice 54 would be added to the effect of the fixed orifice 44 during some portion of the return stroke of the piston 11.

However, because the damper piston 18 has to displace fluid across the damper chamber 52 before it can move, and because the load in the spring 21 is small in comparison with the mass of the piston 18, the acceleration of the pump piston 11 will greatly exceed that achieved by the damper piston 18, thereby minimising error.

It follows therefore that the damper piston 18 is operative to delay the response of the pump 3 to changes in the deceleration of the wheel, orifice 54 being chosen to allow this response to match the decelerations of the wheel during normal braking.

Thus during the higher than normal wheel decelerations which are indicative of a developing skid, the pump 3 cannot fully compensate for the rapidly reducing wheel speed. As a result the flow through the orifice 40 is reduced so that the pressure in the power chamber 24, and thus that applied to the brakes from the outlet port 4, is relieved. Since the orifice 40 has a design to minimize viscosity effects by having sharp edges it will give a square-law pressure/flow characteristic, a 10% increase in wheel slip under these conditions will lead to a 20% reduction in braking pressure.

In the construction described above intermediate braking pressures are provided before the valve member 32 engages fully with the seating 34. In this condition the pressure from the master cylinder at the inlet port 6 is balanced by the force in the spring assembly 36 and the pump pressure below the pistons 26 and 30.

Finally, when the vehicle is stationary with the drive 14 inoperative the brakes can be applied by pressure from the master cylinder which is supplied directly to the outlet port through the valve 27, which is open.

Since the brake and pump circuits are separated by the piston 26, different working fluids can be used in the two circuits.

Where used herein the term "fixed orifice" includes any orifice of which the size can be adjusted during assembly or in service.

I claim:

1. An hydraulically-operated anti-skid braking system for a vehicle comprising a brake for braking the wheel of the vehicle, a reservoir for hydraulic fluid, a pump for providing a supply of hydraulic fluid under pressure from said reservoir, first control means through which hydraulic fluid is delivered by said pump, an outlet port, said first control means including a first orifice through which fluid from said pump is passed to provide a pressure in response to which said brake is adapted to be applied by means of hydraulic fluid being delivered through said outlet port, an inlet port, second control means, and a master cylinder by means of which hydraulic fluid pressure is applied to said second control means through said inlet port, said second control means controlling operation of said pump in response to hydraulic fluid pressure applied to said second control means, wherein said pump is rotatable with rotation of said wheel to be braked whereby said wheel is automatically prevented from locking, and wherein said pump has substantially constant output flow at least throughout a wheelspeed range above a predetermined minimum.

2. A system as claimed in claim 1, wherein said first orifice is so constructed and arranged as to produce a higher proportional drop in pressure for a given proportional drop in flow and through which the pump pressure is circulated to provide a back-pressure which is utilized for brake application.

3. A system as claimed in claim 1 or claim 2, wherein said first orifice comprises a fixed orifice.

4. A system as claimed in claim 3, wherein said fixed orifice has a square law relationship between flow through it and pressure drop developed across it.

5. A system as claimed in claim 4, wherein said fixed orifice has sharp edges to minimize viscosity effects.

6. A system as claimed in claim 1, wherein said pump comprises a housing having a bore, and a pump chamber in said bore, a piston which is reciprocable in said bore to draw fluid from a reservoir and into said pumping chamber during an induction stroke, and to force fluid from said pumping chamber to said first control means upon movement of said piston in the opposite direction during a power stroke, a first one-way valve through which fluid is drawn into said pumping chamber during said induction stroke, a control chamber defined between one end of the bore and the adjacent end of the piston opposite said pumping chamber and into which fluid is drawn from said reservoir, during said power stroke, a second one-way valve through which fluid is drawn into said control chamber during said power stroke, and means for controlling leakage from the control chamber such that movement of said piston in said bore during said induction stroke takes place substantially at a constant rate.

7. A system as claimed in claim 6, wherein said means for controlling leakage from said control chamber comprises a second fixed orifice.

8. A system as claimed in claim 7, wherein a drive is provided for said piston and a valve is located in series with said second fixed orifice and wherein, when said valve is closed, fluid is trapped in said control chamber to hold said piston in a top dead centre position in which said piston is disabled from its drive.

9. A system as claimed in claim 8, wherein said valve is disposed downstream of said second fixed orifice.

10. A system as claimed in claim 6, including an eccentric drive for said piston, wherein a piston-rod carries said piston and said piston-rod co-operates with said eccentric drive to reciprocate said piston during said power stroke, and a compression spring is provided for urging said piston in the opposite direction towards said eccentric drive during said induction stroke.

11. A system as claimed in claim 10, wherein said compression spring has a low rate so that its loading remains substantially constant over the stroke of said piston.

* * * * *